H. E. HALE & J. O. POTTS.
HAND CAR.
APPLICATION FILED AUG. 9, 1909.
948,878.
Patented Feb. 8, 1910.
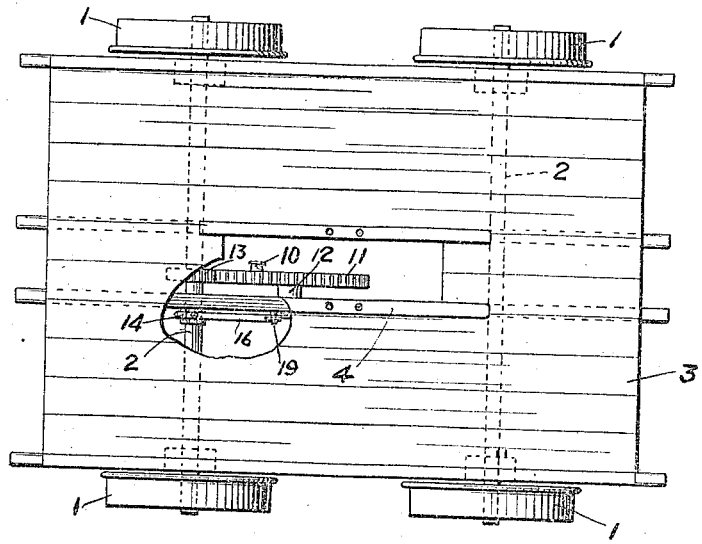
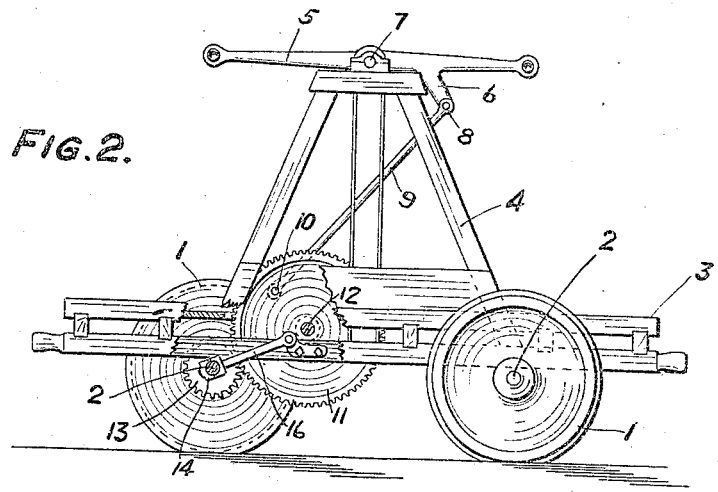
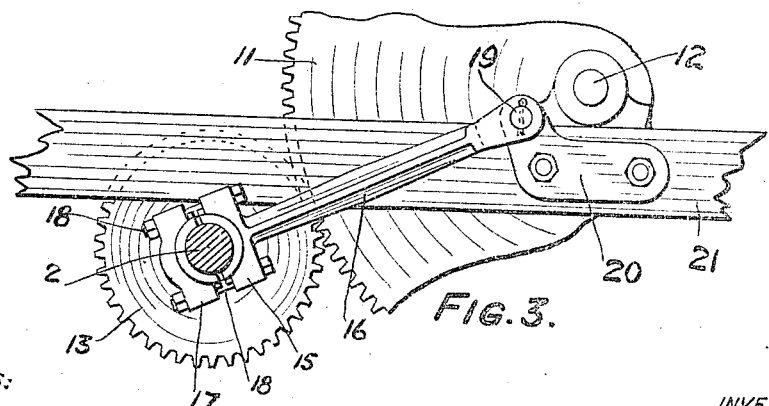
WITNESSES:
INVENTORS
Hugh E. Hale & Jno. O. Potts
BY Charles N. Butler
ATTORNEY.

UNITED STATES PATENT OFFICE.

HUGH E. HALE AND JOHN O. POTTS, OF ST. LOUIS, MISSOURI.

HAND-CAR.

948,878.  Specification of Letters Patent.  Patented Feb. 8, 1910.

Application filed August 9, 1909. Serial No. 511,868.

*To all whom it may concern:*

Be it known that we, HUGH E. HALE and JOHN O. POTTS, citizens of the United States, and residents of the city of St. Louis, in the State of Missouri, have jointly invented certain Improvements in Hand-Cars, of which the following is a specification.

Our invention is a hand car having improved means for holding in mesh the gears through which the axle is driven, so that the car can be operated notwithstanding the bending or disarrangement of the axle.

In the preferred form of our construction, the axle is journaled in a steady box, which is placed near the driven pinion fixed on the axle, and the steady box is connected by a reach rod with a pivotal support carried by a bearing which is fixed to the car frame, so that the reach rod is adapted to turn about an axis disposed in or near the plane containing the axis of the pinion and of the driving gear engaging therewith.

In the accompanying drawings, Figure 1 represents a sectional plan view of a hand car having our improvements applied thereto; Fig. 2 is a sectional side elevation of the same; and Fig. 3 is a sectional side elevation showing in enlarged view our improved means connecting a car axle and sill.

Our improvements, as shown in the drawings, are applied to a usual type of car, comprising the wheels 1 fixed on the axles 2, the frame 3 carried by the axles, the bent 4 carried by the frame, the hand lever 5 having the crank arm 6, the journal bearing 7 whereby the lever is fulcrumed on the bent, the rod 9 having the pivotal connection 8 with the arm 6 by which it is operated, the driving gear 11 having the axle 12 whereby it is journaled in the frame, the crank pin connection 10 between the rod and the gear 11 whereby the latter is revolved, and the driven gear or pinion 13 fixed on an axle 2 and meshing with the gear 11 which revolves it.

The axle 2, which carries the pinion 13, revolves in a steady box or bearing 14 which is composed of the member 15 connected with the reach rod 16 and the member 17 connected adjustably with the member 15 by bolts 18. The reach rod extends to and is pivotally supported by an arbor or pivot 19 carried by a shoe or bracket 20 which is fixed to a part of the car frame, as the sill 21, so that the pivot 19 lies between the axes of the gears 11 and 13, in or near the plane passing through such axes. In this construction, the reach rod 16, thus connecting the driven axle 2 with the car sill 21 through the steady box 14 and the bracket 20, will hold this axle, which carries the driven pinion 13, so that it is limited to a movement from its normal position around the periphery of the driving gear 11 and consequently in such movement of the axle the driven pinion will remain in mesh with the driving gear and maintain its proper operating relation therewith.

Having described our invention, we claim:

1. In a hand car, a revoluble axle, a pinion fixed thereon and a driving gear in mesh with said pinion, in combination with a reach rod having a bearing in which said axle revolves and a support about which said bearing is adapted to turn, for the purpose specified.

2. In a hand car, an axle, a pinion fixed thereon and a driving gear engaging said pinion, in combination with a reach rod having a bearing in which said axle is journaled and a pivotal connection disposed between the axes of said pinion and gear.

3. In a hand car, a frame, an axle journaled relatively thereto, a pinion fixed on said axle, a driving gear journaled relatively to said frame and engaging with said pinion, a reach rod having a bearing in which said axle is journaled, and means fixed to said frame with which said rod is pivotally connected so that said pinion is held against substantial movement away from said gear.

4. In a hand car, a frame, an axle journaled relatively thereto, a pinion fixed on said axle, a driving gear journaled relatively to said frame and engaging with said pinion, a reach rod having a bearing in which said axle is journaled, and means fixed to said frame with which said rod is pivotally connected so that said pinion is held against substantial movement away from said gear and allowed to move circumferentially thereto.

In witness whereof we have hereunto set our names this 5th day of August, 1909, in the presence of the subscribing witnesses.

HUGH E. HALE.
JOHN O. POTTS.

Witnesses:
M. MILLER,
A. A. MILLER.